United States Patent [19]

Otterson

[11] 4,244,134

[45] Jan. 13, 1981

[54] DISPOSABLE PEST TRAP

[76] Inventor: Harry J. Otterson, 218 Ewell Ave., Gettysburg, Pa. 17325

[21] Appl. No.: 28,254

[22] Filed: Apr. 9, 1979

Related U.S. Application Data

[63] Continuation-in-part of Ser. No. 908,099, May 22, 1978, abandoned.

[51] Int. Cl.³ .................... A01M 23/00; A01M 1/14
[52] U.S. Cl. .................................... 43/58; 43/114
[58] Field of Search .................. 43/58, 65, 114, 121, 43/131

[56] References Cited

U.S. PATENT DOCUMENTS

| | | | |
|---|---|---|---|
| 1,011,304 | 12/1911 | Andrews | 43/65 |
| 1,265,932 | 5/1918 | Maltby | 43/121 |
| 2,328,591 | 9/1943 | Weil | 43/131 |
| 2,340,256 | 1/1944 | Weil | 43/131 |
| 2,962,836 | 12/1960 | Hughes | 43/114 X |
| 3,913,259 | 10/1975 | Nishimura | 43/131 |
| 3,940,874 | 3/1976 | Katsuda | 43/114 |
| 4,044,495 | 8/1977 | Nishimura | 43/114 |
| 4,161,079 | 7/1979 | Hill | 43/114 |

FOREIGN PATENT DOCUMENTS 2351595  5/1976  France ........................ 43/114

Primary Examiner—Nicholas P. Godici
Attorney, Agent, or Firm—Eugene E. Renz, Jr.

[57] ABSTRACT

Inexpensive, disposable pest traps for insects of all types including roaches, and for small animals such as mice and rats, are described which comprise an elongated tubular housing composed of a central tube and two end tubes assembled in axially concentric telescoped relation, the central portion of said housing being internally coated with an adhesive means for trapping said pests. The housing or a portion thereof may be sufficiently transparent or translucent to permit visual determination of whether or not the trap contains a pest or pests; said traps being disposed of as garbage or trash after use.

8 Claims, 11 Drawing Figures

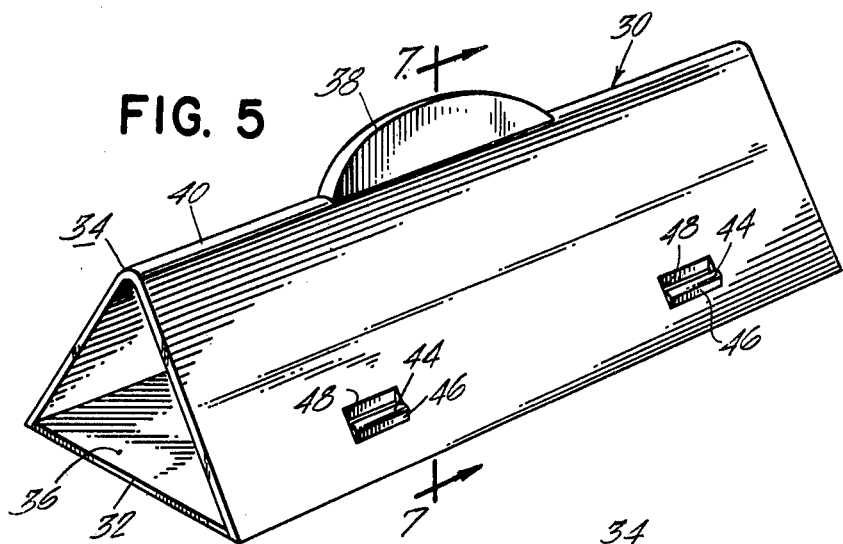
FIG. 5
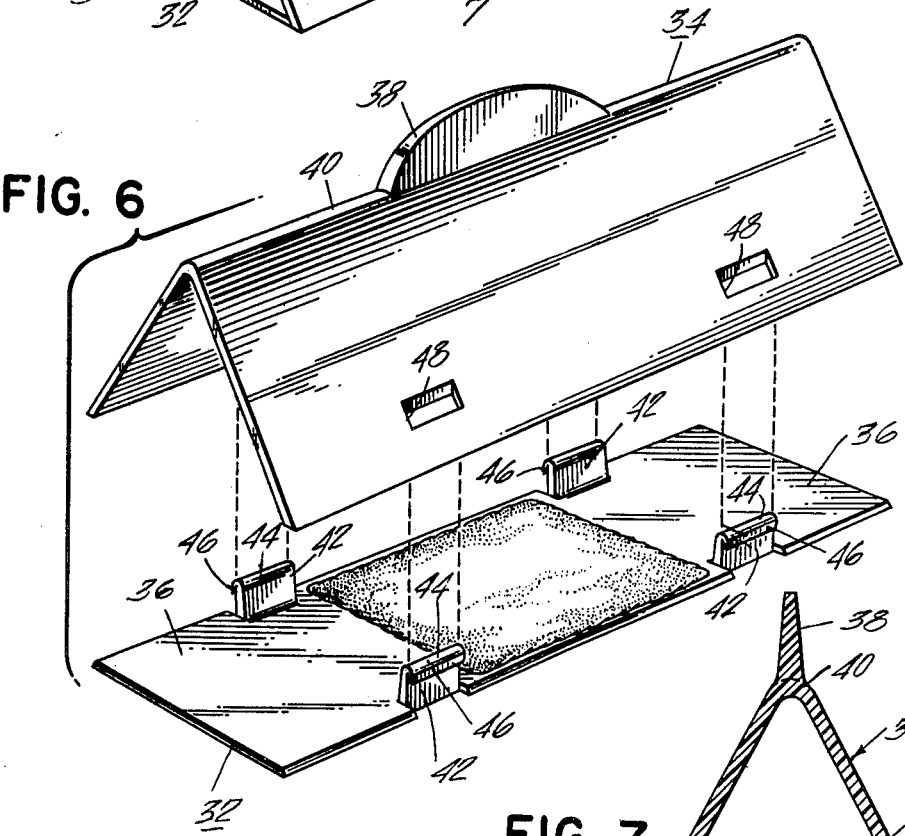
FIG. 6
FIG. 7

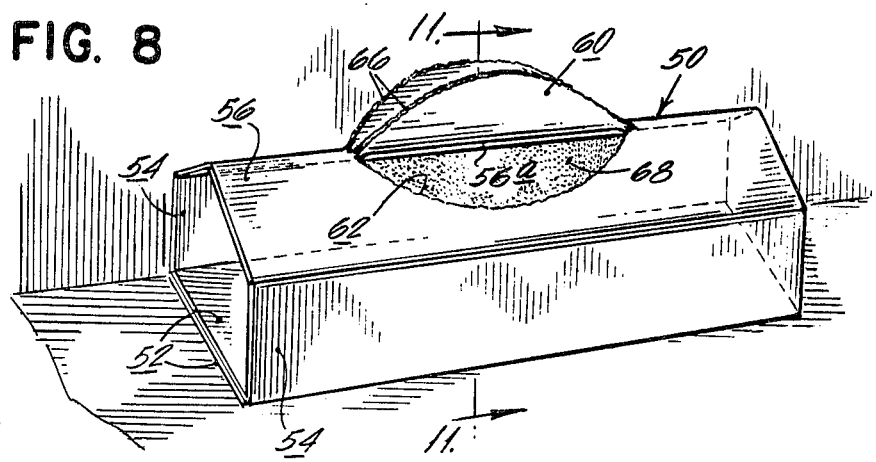
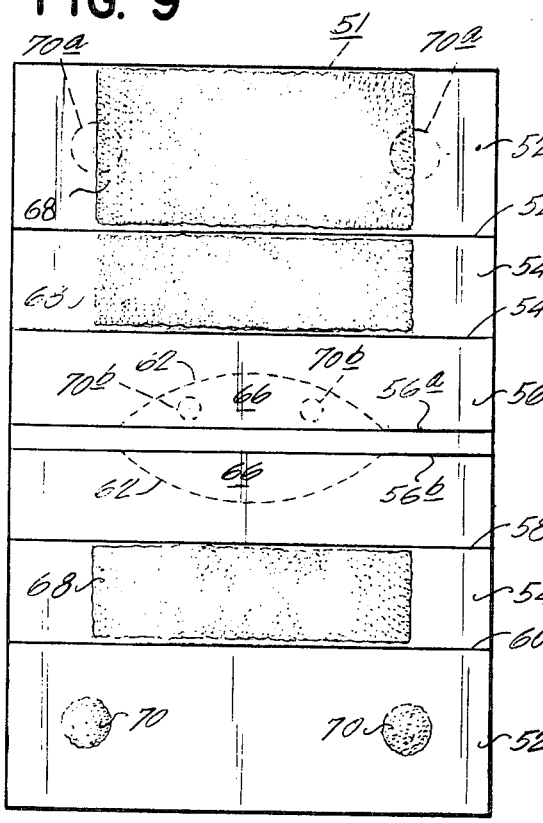
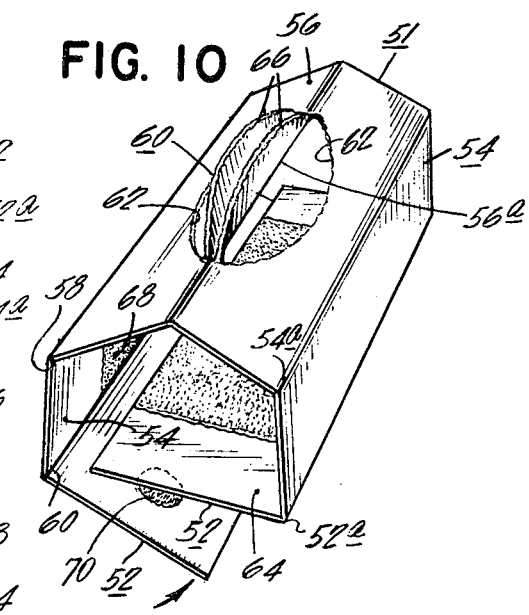
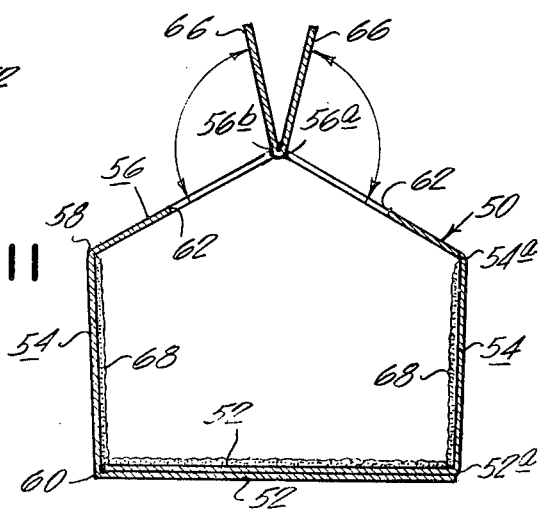

DISPOSABLE PEST TRAP

This application is a continuation-in-part of my prior application DISPOSABLE PEST TRAP filed May 22, 1978 and bearing Ser. No. 908,099 now abandoned.

BACKGROUND OF THE INVENTION

The present invention relates to disposable pest traps and particularly to mouse traps. As is well known, pests such as roaches and mice, among others, multiply at a very rapid rate and it is important to be vigilant in their detection and to take immediate steps to eliminate them before they have an opportunity to breed. This is particularly important in food storage, processing, preparation and serving areas. Inasmuch as most pesticides or rodenticides take several days to a week or more to kill, they are less than satisfactory in the prevention of increased infestation. Moreover it is obviously undesirable to employ such poisonous materials in such food areas or where children, pets, desirable animals or even adults may possibly be harmed by them. Another serious disadvantage of poisons is that the poisoned pest, a mouse for example, tends to crawl off to an inaccessible hiding place to die, decay and produce a distressing odor problem difficult or impossible of solution. For these and other reasons, attempts have been made to entrap pests in such a way that the disadvantages of the use of poison are avoided and the opportunity for the pest to hide in an inaccessible place is eliminated.

THE PRIOR ART

Weil, U.S. Pat. No. 2,328,590 issued Sept. 7, 1943, discloses a device for trapping roaches called a roach run. This device comprises a substantially rectangular blank conformed to provide a tube-like housing which is of considerable length in comparison to its cross-sectional dimensions. The blank is provided throughout its length with crease-lines by means of which the blank is divided into five panels. Two additional panels of much shorter length than the blank overlie the end portions of the inner faces of the panels of the blank. These shorter panels are glued or otherwise secured to the five panel blank and extend from the outer edges of the blank inwardly to predetermined points at each end thereof. A paste or any other desirable poisonous roach food is spread over preferably the entire width of four of the five panels of the blank on the inner face thereof so as to leave the two extra end panels uncoated. This structure is then folded along the crease lines with the two edge panels overlapping to form a tubular structure of rectangular cross-section which is held together by glue or other suitable means. In this way the uncoated end panels provide safety zones to prevent the poison from exiting from the tube if it should flow. Such roach runs may be joined end-to-end to provide a run of greater length. It is also stated that the cross-section of the roach runs may be cylindrical rather than rectangular as described above. Such roach runs are placed throughout the roach infested premises. Due to the proclivity of roaches to hide in narrow spaces and to seek out the dark, roaches will soon occupy the roach runs and either eat or absorb the poison by contact, thus killing the roaches.

Staley, U.S. Pat. No. 3,304,646 issued Feb. 21, 1967 describes a trap for bugs and the like and particularly beetles, spiders, cockroaches, earwigs, flies, ants, bees and termites and, depending on the size of the trap, even for mice, rats and other small animals. The objects of the invention are to take advantage of the natural tendency of insects and mice to crawl into holes and to locate in the holes a sticky glue-like fly paper or birdlime which may be poisoned and preferably also a food which attracts by its odor. It is also an object of the invention to make traps which are so inexpensive that they may be freely used and then picked up and disposed of in the garbage or the incinerator. The traps are made from corrugated paper or the like, the corrugations thereof providing the desired plurality of holes into which the insects may crawl. The traps may be opaque, transparent or of colored material. The trap may be curved as at a 90° angle or may be rectilinear. In the preferred curved embodiment one end of the trap is closed. In another embodiment a plurality of axially concentric coextensive tubes of varying diameter are used. The channels or holes may be of cylindrical, triangular, wave-form, corrugated or polygonal cross-section.

Pearsall U.S. Pat. No. 3,398,478 issued Aug. 27, 1968 relates to snares for small animals such as rats and mice. The device consists of a tubular member, preferably flattened on its bottom, and providing an enclosed pathway. The tube may be of cylindrical, rectangular or of other cross section and may be formed of any suitable material such as cardboard, paper or plastic. The dimensions of the tube depend upon the size of the animal to be caught and will have a width materially less than the length of the animal but at least slightly greater than the width of the animal in order to allow for ready access and free movement of the animal along the pathway. By way of example, for catching a mouse, the tube may be from 4 to 6 inches long and approximately 1.5 inches in diameter. The tubes are coated internally with an adhesive except on the flat bottom area or pathway for the animal. Bait attractive to the animal to be caught is secured within the tube adjacent one end thereof which is closed. In this way the snare provides an unimpeded pathway to the bait adjacent its inner closed end. After entering the snare and proceeding to the bait, the animal is caught in the adhesive on the inner sides and top of the tube as it turns to leave due to the dimensions of the tube which make it impossible for the animal to turn around without contacting the adhesive-coated surfaces. In this way the animal is caught out of sight adjacent the closed end of the tube and the entire snare and animal may then be disposed of in any suitable manner.

The concept of glue-coated surfaces upon which to trap small insects such as flies on fly paper and mice on glue boards is well-known in the art. However, the usual practice involving the entrapment of animals or insects with glue has many disadvantages among which are the unpleasant sight of the trapped insects or animals, and the possibility of pets, children or others coming in contact with the glue surface. Indeed, glues or adhesives especially designed for such use are commercially available. Among these may be mentioned a material available under the trademark TRAP-STIK from Southern Mill Creek Products Company, Inc. of Tampa, Florida and Cleveland, Ohio. Advertising literature for this material suggests a wide variety of applications among which may be mentioned the use of a plastic cylinder about 2 inches in diameter and 2 feet long or longer coated internally with the adhesive and disposed between ceiling pipes to catch mice.

It appears, therefore, that the concept of employing an adhesive coated surface to capture mice, insects and the like is broadly old in the art. However, it is also apparent that the devices of the prior art have been unduly complex and difficult to manufacture in some instances, or required controlled dimensions closely proportioned to the size of the animal to be trapped thus requiring a choice or selection of sizes of snares, or employed a closed-ended passage limiting access to the trap, or special and sophisticated structural configurations. It is apparent, therefore, that a need has remained in the art for a device employing the adhesive snare concept but which is not subject to the limitations and disadvantages of the prior art.

It is a primary object of the present invention, therefore, to provide an adhesive snare for mice, rats, other small animals, insects and garden pests which is not closely limited by dimensional considerations, is not closed at one end so as to limit access thereto, is simple and inexpensive to manufacture and use, and which has a novel but simple structure facilitating both manufacture and use.

It is another object of the invention to provide such a snare or mouse trap which does not depend upon any particular activity of the animal to be trapped or closely corresponding dimensions between the trap and animal for effective use.

It is still another object of the invention to provide such a snare or mouse trap with visual means for determining whether or not a mouse has been caught in the trap, but without substantial aesthetic loss.

It is yet another object of the invention to provide an effective but compact mouse trap which is readily handled in an entirely sanitary and aesthetic manner to dispose of the trapped mouse.

It is another object of the invention to provide an entirely harmless disposable mouse trap of low cost employing no poison bait which obviates the possibility of poisoned mice dying in the walls of the premises or in order hiding places and causing unpleasant odors on decay.

SUMMARY OF THE INVENTION

The foregoing and other objects of the invention which will become apparent below are attained by providing an improved trap of the tunnel-adhesive type which employs a relatively short central tube and a pair of relatively short end tubes which are assembled in concentric coaxial telescoping relation to form an elongated but relatively compact trap having an internal passageway including an intermediate adhesive coated area and terminal adhesive free areas at each end. The invention includes less preferred embodiments in which the central tube is outside of the end tubes and preferred embodiments in which the end tubes are outside of the central tube. The invention also includes embodiments in which the end tubes are fully telescoped over the central tube with the inner ends of said end tubes meeting at the center of the trap. In other embodiments the inner ends of the end tubes are somewhat spaced apart. In some embodiments the three tubes are assembled in a fixed relation while in others the end tubes are free to slide apart for visual inspection of the contents of the trap. The traps are composed of opaque, translucent, colored-clear and transparent materials, each alone, or in various combinations, all as will appear more fully below.

The invention will now be described in greater detail in conjunction with the accompanying drawings, wherein:

FIG. 5 is a perspective view of another embodiment of pest trap constructed in accordance with the present invention;

FIG. 6 is an exploded perspective view of parts comprising the trap;

FIG. 7 is an enlarged sectional view taken on lines 7—7 of FIG. 5;

FIG. 8 is a perspective view of still another embodiment of pest trap in accordance with the present invention;

FIG. 9 is a plan view of a blank for forming the pest trap of FIG. 8;

FIG. 10 is a perspective view of the blank of FIG. 9 in a semi-folded position; and FIG. 11 is an enlarged transverse sectional view taken on lines 11—11 of FIG. 8.

Figure 1:
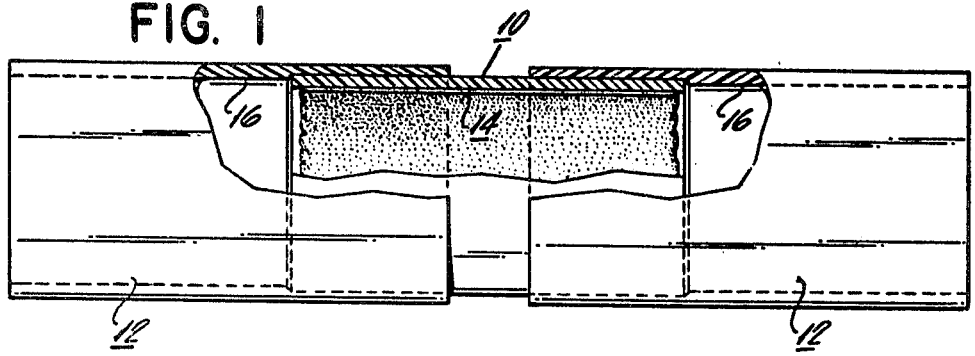
FIG. 1 is a side elevational view of a cylindrical pest trap of the invention having two end tubes telescoped over a central tube.

The preferred embodiment of the present invention shown in the drawings includes an elongated tunnel-like housing composed of a central tube 10 and a pair of end tubes 12. These tubes 12, as shown in the drawings, have a circular cross-section but can have any other suitable cross-section whether oval or polygonal; the latter being preferred if other than a circular cross-section is employed. The three tubes are suitably dimensioned so that they may be assembled by a simple axially concentric press fit into the completed elongated tunnel-like housing as shown. This may be done by sizing the end tubes 12 so that they have an internal diameter slightly larger than the external diameter of the central tube 10 permitting them to be slipped over the central tube, one at each end. When this is done the end tubes may be forced onto the ends of the central tube only, if desired, so far as is necessary to provide sufficient engagement for structural integrity of the assembly. The tubes may be fastened together by any suitable mechanical or adhesive means if necessary or desirable. In another embodiment of the invention shown in FIG. 3, the inner ends of the end tubes are separated being inserted in recessed areas at the ends of the central tube, still exposing the inner glue-coated surface of the central tube therebetween.

This embodiment permits application of adhesive to the internal surface of the central tubular member with subsequent assembly of the end tubes. More specifically the central tube may be of a greater cross-section and recessed at opposite axial ends as at 18 to define a shoulder abutment for positioning the end tubes. The undercut surface of the central tubular member may be coated with glue to provide means holding the end tubes in place. The tubes may be sized to provide a press fit.

Figure 2:
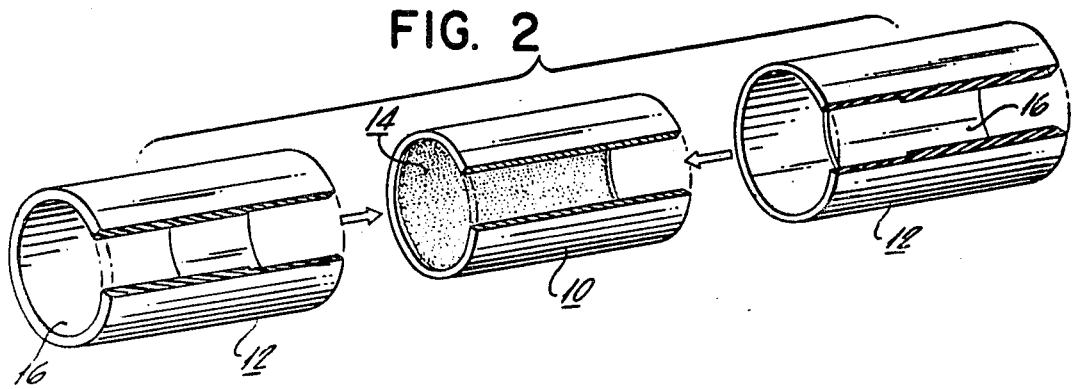
FIG. 2 is an exploded view of the pest trap of FIG. 1 showing its disassembled component parts.
Figure 3:
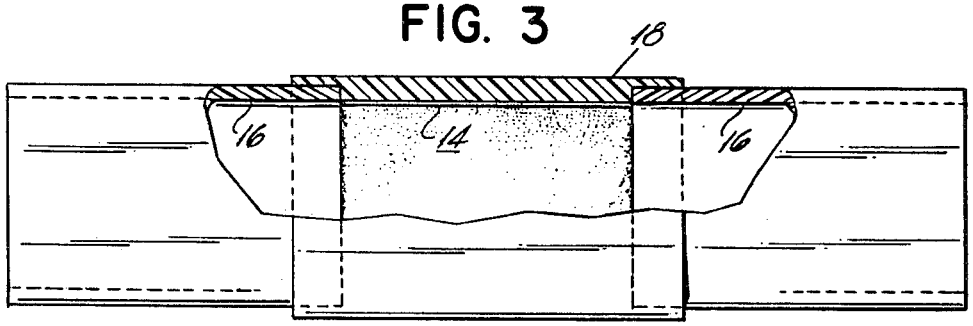
FIG. 3 is a side elevational view of another embodiment of the invention in which the end tubes are telescoped within recessed ends of the central tube.
Figure 4:
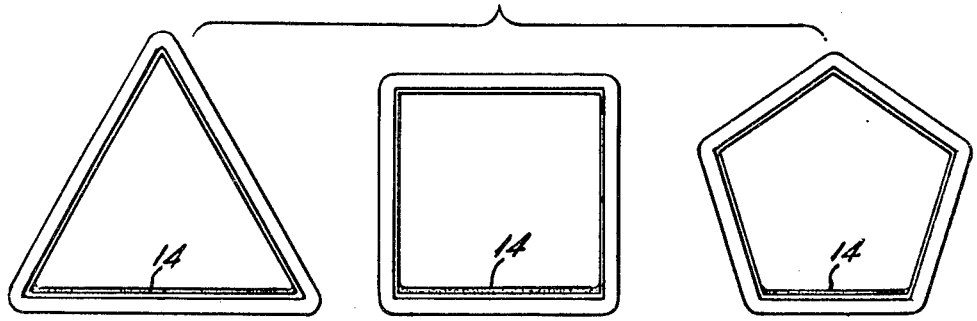
FIG. 4 is an end elevational view of three additional polygonal pest traps of the invention having triangular, rectangular and pentagonal cross-sections, respectively.

While the embodiments of FIGS. 1, 2 and 3 are cylindrical in form and have a circular cross-section, it will be apparent that the invention includes other embodiments having an oval or other curved cross-section. Other especially desirable embodiments of the invention have a polygonal cross-section. Without limitation, thereto, FIG. 4 shows three desirable polygonal cross-sections, i.e. triangular, rectangular and pentagonal, respectively. These embodiments have the advantage of having planar sides, any one of which may be taken as the bottom, so that only the central internal surface of that one side need be coated with adhesive.

The traps of the present invention may be constructed of a wide variety of materials. Without limitation thereto, such materials include paper board, paper, plastic, metal, glass or ceramics. For aesthetic reasons it is preferred that the traps be opaque in order to hide the trapped animal such as a mouse from view. However, for practical reasons it is desirable that at least the central portion of the traps where the adhesive is in place should be sufficiently transparent to permit visual determination as to whether or not a trapped animal is present. Full transparency is not necessary for that purpose if aesthetic considerations are important, since the interruption of light by the body of a mouse, for example, in a translucent or clear-colored but not transparent trap or central tube will be sufficient for the purpose. Therefore, a wide variety of embodiments of the invention are available employing many different materials of construction alone or in combination. For example, the entire trap may be composed of opaque cardboard, plastic or other material. Alternatively the entire trap may be composed of translucent plastic, or if aesthetic considerations are not important, the entire trap may be made of transparent plastic. Again the end tubes 12 may be made of opaque material partially telescoped over a translucent or transparent central tube thus permitting visual determination of the condition of the trap, i.e. empty or occupied. Indeed, the invention lends itself to a variety of other means of visual inspection of the trap after use. For example, the adhesive-coated portion of the tube or the entire trap may be made of a clear but colored material such as plastic; the color being of sufficient intensity to obscure clear vision of the trapped mouse, but to permit sufficient vision that it is possible to tell by a difference in light transmission whether or not there is a mouse in the trap.

As another example of the versatility of the invention, one or both of the telescoped end tubes may be left free to slide with respect to the central tube. In this way, for example, a transparent, translucent or clear but colored control tube 10 may be completely hidden by fully telescoped opaque end tubes, but with the possibility remaining to inspect the contents of the trap by sliding the end tube or tubes outwardly to reveal the transparent or translucent central tube.

In use, the traps are merely placed in locations where pests have been observed or areas sought to be protected, and left there until such time as visual inspection indicates the desirability of disposal of the used traps. Such disposal may be by any suitable means such as in the trash or garbage for municipal or private collection, or by incineration, burying, or otherwise.

While the dimensions of the traps may vary depending upon the pests to be trapped, these dimensions are not critical and need not be closely correlated to the size of the pest for effective use as is the case with some tunnel-adhesive type traps of the prior art. For example, a trap having a diameter of about 1.5 is suitable for all insects and garden pests such as roaches, water bugs, beetles, spiders, snails, slugs and the like and is also large enough for mice. Therefore, this one size of trap is virtually universally useful for most residential and food preparation and serving areas. The length of the traps, beyond the minimum necessary to hold the pest in question, is not critical, but it is generally desirable not to make the traps larger than necessary. For example, a preferred mouse and roach trap has a central tube 2 to 3 inches long and 3 inch end tubes for an overall length of only 6 inches. Traps having a larger diameter are, of course, necessary for larger rodents or other animals such as rats, squirrels and the like.

Any suitable adhesive may be used in the traps of the invention. It is desirable, however, to facilitate production of the traps, to use an adhesive which flows at elevated temperatures for application to the tubes, but which becomes strongly tacky and capable of securely holding the pest to be trapped at ambient temperatures. One such adhesive is commercially available under the trademark TRAP-STIK from Souther Mill Creek Products Company, Inc. of Tampa, Florida and Cleveland, Ohio.

It will be apparent from the foregoing description of certain preferred embodiments of the invention that the new traps are of unique but simple construction, small in size, inexpensive to produce, easy to use and present no disposal problem. The preferred three (3) piece design is particularly simple and economical to make and assemble. The inner central tubular member is simply coated with an adhesive means over its internal peripheral surface and thereafter the outer end tubular members are merely slipped over the central member, the sizes of the members being chosen to provide a friction fit. Some of these adhesives are difficult and messy to handle and thus it would be a difficult and time consuming procedure to apply it to a localized internal area of a single tubular member.

The traps are entirely sanitary and can be readily handled, even when containing trapped pests by the most squeamish persons without distaste or distress. Still further the traps can be quickly deployed when an infestation is noticed and, better still, may be routinely left in areas to be protected even when no current infestation exists. This is highly desirable, as noted above, to immediately trap any past entering the area before it can breed and cause a serious infestation. It is apparent, therefore, that the new traps satisfy all of the objects of the invention in providing low cost, harmless disposable mouse and roach traps, using no poison and obviating the need to touch the trapped pest. The new traps also made it impossible for a trapped mouse or rat to hide, die and decay in inaccessible areas with consequent odor problems. The new traps may be baited with harmless non-poisonous foods of any type known to attract the pests in question by odor or otherwise. The traps are also useful for agricultural or other large scale use due to their low cost and harmless character.

There is illustrated in FIGS. 5-7 another embodiment of pest trap constructed in accordance with the present invention and generally designated by the numeral 30. Similar to the previously described embodiment, the trap may be constructed of a wide variety of materials including paper board, paper, plastic, metal, glass or ceramics and for esthetic reasons it is preferably opaque in order to hide the trapped animal such as a mouse from view. However, for practical reasons it may have at least a portion which is sufficiently transparent to permit visual determination of the presence of a trapped animal.

As illustrated, considering now more specifically the structure of this embodiment, the trap is preferably of triangular-shaped cross section comprising an elongated generally rectangular base 32, and a top section 34 of inverted V-shaped cross section. The base 32 as illustrated has a non-poisonous adhesive which is localized to the central area of the base to define ramp areas 36 at opposite areas of the base. Optionally, the interior walls of the top section 34 may likewise be coated with the adhesive in the same localized area as the base.

A hand grip portion 38 of arcuate shape is formed integrally with the top section 34 and projects upwardly from the apex 40. This provides means for moving the trap to place it in location and also for discarding the trap when an animal has been caught therein.

The base 32 and top section 34 are detachably secure to one another for ease of construction and assembly. To this end the base has, in the present instance, four locking lugs 42 formed integrally therewith which project upwardly from the base and as illustrated are spaced inwardly from opposite ends thereof. Each lug 42 is of inverted J-shaped cross section having a hook portion 44 with a gently curved or tapered outer edge 46. The top section as illustrated has four complementary slotted openings 48 spaced upwardly from the lower side edges thereof to receive the hook portion. The top section 34 has a certain amount of flexibility and the lugs also are flexible so that when the top section is initially placed on the base, the gently curved outer portions of the lugs engage the wall section slightly below the openings 48. Now as the top 34 is pressed down over the base 32, the lugs 42 are flexed inwardly to engage through the slotted openings 48 and securely grip the top section with the hook face portion of a lug snapping over the lower side edge of each of the openings.

In making the trap according to the present invention, parts may be easily molded from plastic and in assembly line fashion, the base and top sections may be separately coated with the adhesive and thereafter simply snapped together in the manner described above. The trap is then ready for use.

If desired an attractant or bait may also be placed on the base in the center of the adhesive area.

There is illustrated in FIGS. 8-11 inclusive another embodiment of pest trap in accordance with the present invention generally designated by the numeral 50. In accordance with this embodiment, the trap is of polygonal construction including an elongated generally rectangular base 52, elongated generally rectangular upstanding sidewalls 54 projecting from outer side edges of the base and a peaked roof or top section 56 of inverted V-shaped cross section. The trap is also formed with a hand grip portion 60 comprising in the present instance upwardly projecting arcuate flaps formed integrally with the top which also provide a window opening 62 to observe the interior of the trap from either side of the handle.

In accordance with this embodiment, only the interior surface of the base 52 and the interior surface of the sidewalls 54 are coated with an adhesive preferably spaced inwardly from opposite ends to define ramp areas 64. The interior surfaces of the roof section are uncoated.

The trap illustrated and described above has novel features of construction and arrangement which utilize the instinctive and natural habits and curiosities of pests such as mice. For example, mice have a tendency to scurry or travel close to the baseboard in a room and are curious about open-ended passages. Thus the trap of the present invention may be positioned snugly against the baseboard and also in similar position under appliances, food storage shelfs and other similar locations where mice tend to frequent. By reason of a non-poisonous adhesive, the trap is completely safe around children and pets and also meets the high standards of the Environmental Protection Agency's (EPA) regulations for food handling establishments such as restaurants and the like.

An important feature of the trap of the present invention is the fact that the peaked roof or top section is uncoated. Often mice in entering an enclosed area will hunch their backs and if the interior surface of the top section were coated with an adhesive, the hunching may result in only a partial entrapment of the mouse which he can break. By eliminating this, the mouse feels no binding obstruction when he hunches and therefore, will continue to enter the trap when his back engages the smooth, uncoated surface of the top section as he is progressing toward the center area and the bait. Once he has entered the trap to this extent, the adhesive on the bottom and sides will entrap him and prevent escape.

The pest trap described above is simple and economical to manufacture and may, if desired as illustrated in FIG. 8, be made of a single sheet material such as a rectangular paperboard for instance, card board, having a series of parallel spaced score lines defining folds for bending the board and forming it to the configuration shown in FIGS. 8 and 10. Thus in the embodiment illustrated, rectangular blank 51 has a series of spaced parallel score lines 52a, 54a, 56a, 56b, 58 and 60. Symmetrical about score lines 56a and 56b are a series of arcuate perforations defining grip portions 66. The cord of the perforated arcs are defined by the score lines 56a and 56b and become the hinge locations when the grip portions 66 are pushed through the blank 51. When the blank 51 is broken along these perforated areas, the flap sections are pushed through the panel and form the hand grip portions 66. The grip 66 may have on the reverse side of the blank 51 two contact adhesive dots 70b to cement both the grips 66 into a single upstanding vertical holder 60. As illustrated, the base and side panels are coated with the non-poisonous adhesive material 68. The adhesive is localized on the base to provide ramp areas on opposite ends of the adhesive. Note also that the interior of the roof section is preferably not coated with an adhesive for the reasons noted above. A pressure sensitive adhesive 70 may be applied to one of the bottom flaps so that when the blank is folded along the scores, the bottom flaps are in overlapping relation and the pressure sensitive adhesive secures the bottom flaps together. Also contact adhesive dots 70a may be applied to the reverse side of blank 51 on the bottom panel 52 so as to coact with the adhesive dots 70 when folded to the erect position. The dots may also be color coded to aid in the proper folding of blank. Alternatively, staples or other fastening means may be employed to secure the bottom flaps in the overlapping relationship illustrated. It is also to be understood that while this embodiment of the pest trap may be made from a single sheet of card board or the like, it may also be made from plastic material with suitable V-scoring to permit folding of the panels along the bend lines.

What is claimed is:

1. A rodent trap comprising an elongated base, spaced upstanding sidewalls projecting from the outer side edges of said base, a top spaced from and overlying the base to define an elongated enclosure open at opposite ends, adhesive means on the interior surface of said base and sidewalls only, said adhesive means on the base spaced inwardly from the outer end edges at opposite ends of the base to define non-adhesive ramp areas, said interior surface of the top being non-adhesive.

2. A trap as claimed in claim 1 wherein the adhesive on the sidewalls is spaced inwardly from the opposite open ends of the trap a distance equal to the depth of the ramp area.

3. A trap as claimed in claim 1 wherein the top is of inverted V-shaped cross section.

4. A trap as claimed in claim 3 including hand grip means projecting upwardly from the apex of the top adjacent the central portion of the trap.

5. A trap as claimed in claim 3 wherein the hand grip means are formed by generally semi-circular projections which are hingedly connected to the top at the apex and wherein the arcuate portions are connected to the top by fracturable means.

6. A trap as claimed in claim 1 wherein said sidewalls are generally parallel and extend vertically from said base.

7. A blank from which a pest trap may be formed comprising an elongated base, spaced upstanding sidewalls projecting from the outer side edges of said base, a top spaced from and overlying the base to define an elongated enclosure open at opposite ends, said blank comprising an elongated generally rectangular sheet of a pliable, bendable material having spaced parallel side edges and spaced parallel end edges, a series of transversely extending spaced generally parallel score lines defining panel sections including a first score line spaced from one end edge of the blank defining a first panel section forming the base, a second score line parallel to and spaced from the first score line defining a second panel section forming one of the sidewalls, a third score line parallel to and spaced from said second score line defining a third panel section forming the top and a fourth score line parallel to and spaced from said third score line defining a fourth panel section forming the opposite sidewall and adhesive means on one face of said first, second and fourth panel sections spaced inwardly from opposite side edges of said blank.

8. A blank as claimed in claim 7 including a fifth score line parallel to and midway between said third and fourth score lines to define a top of V-shaped cross section and including a pair of arcuate perforated areas on opposite sides of said fifth score line defining hand grip portions for the trap.

* * * * *